April 2, 1968 O. E. ALBERTSON ET AL 3,375,794
WASTE BURNING SYSTEM WITH INTERNAL SCREEN DELIQUEFIERS
Filed April 27, 1966
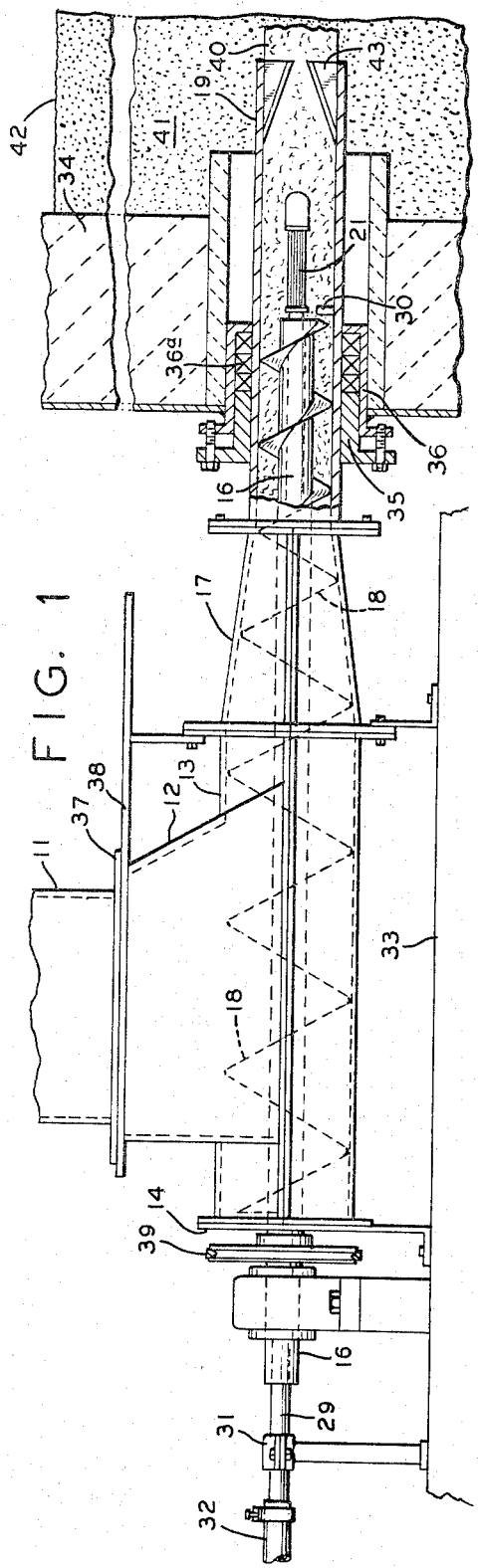
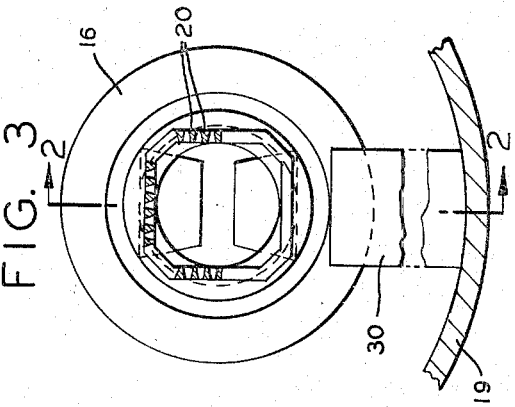
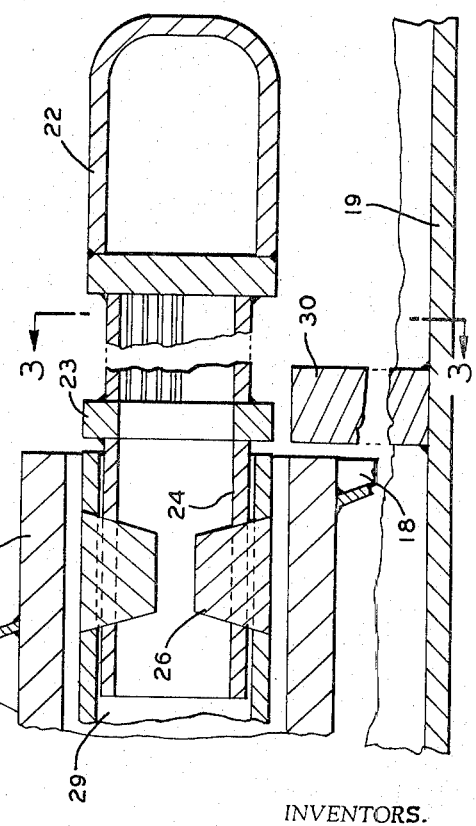
INVENTORS.
ORRIS E. ALBERTSON
WILLIAM M. H. KILMER
BY George S. Hastings
ATTORNEY.

United States Patent Office 3,375,794
Patented Apr. 2, 1968

3,375,794
WASTE BURNING SYSTEM WITH INTERNAL SCREEN DELIQUEFIERS
Orris E. Albertson, Norwalk, and William M. H. Kilmer, Sandy Hook, Conn., assignors to Dorr-Oliver Incorporated, Stamford, Conn., a corporation of Delaware
Filed Apr. 27, 1966, Ser. No. 545,752
12 Claims. (Cl. 110—8)

ABSTRACT OF THE DISCLOSURE

A waste burning system including a dewatering sludge feed having a conduit with a restricted outlet, a rotating worm feeding sludge through the conduit and a dewatering screen in the conduit downstream of the worm having an outlet tube extending from the screen through the worm for withdrawing liquid from the sludge.

---

This invention relates to an internal screen deliquifier for pressure conduits carrying moist fibrous material, and is particularly useful with screw or progressive cavity feeding of dewatered waste organic material into an incandescent fluidized inert material bed reactor as disclosed in applicants' copending application S.N. 356,211, filed Mar. 31, 1964, now Patent No. 3,319,587. In one of its aspects the present invention constitutes an improvement on that disclosed in said application in which a screw feeds dewatered sludge normally containing between 20 and 50% solids under pressure through a restricted passage to form a solid plug which seals the opening to the reactor, and is cut into sections by stationary knives projecting into the passage, for the purpose of forming solid pieces which will burn evenly in the bed and have little tendency to float up into the freeboard.

The pressure set up by the restricted passage and the knives tends to squeeze out water which backs up and floods the screw permitting it to rotate idly without feeding. This device prevents this flooding of the screw and also eliminates additional water from the sludge in a very simple manner without material change of or interference with the operation of the sludge feeding mechanism. Even a few percentage points more solids in the sludge decreases fuel consumption materially and may make possible completely autogenous combustion of the waste sludge, the combustion of which would otherwise require significant amounts of auxiliary fuel. One reason for this in drying the sludge in the combustion chamber fuel is not only used to drive off the water in the form of steam, but the combustion temperatures are such that in addition fuel is wasted in superheating the steam to the temperature of the combustion products.

In carrying the invention into effect, applicants provide a removable hollow internal screen located centrally within a portion of the feed conduit in which the moist plastic material is being fed under pressure. This internal screen is connected by a conduit with the exterior of the pressure conduit, thus removing water from within the feed conduit.

This hollow internal screen is particularly suitable for use with an axial flow rotary pump such as a screw or progressive cavity type pump by making the screw or worm thereof hollow and inserting a tube carrying the screen through the center of the screw, the screen extending beyond the end of the screw or worm into the pumped material under pressure so that water is squeezed out of the material into the cavity of the screen.

Thus, among the objects of our invention are to provide an internal dewatering screen at a point of substantial or maximum pressure, for example in or preceding an extruding nozzle in the feed conduit to an incinerator.

It is a further object to make this screen removable for cleaning preferably without interfering with the continuing operation of the sludge feeding screw or rotor.

Another object of the invention is to so construct this screen and its support that it may project through and be removable from a hollow screw or other axial flow rotary pump element without interfering with the continuing rotation of the pump.

Another object is to provide a screen of a longitudinal inward radial wedge shape, which will be in the main self-cleaning and particularly efficient in connection with a longitudinally moving body of moist plastic material passing along said screen.

Referring now to the drawings illustrating one embodiment of my invention:

FIGURE 1 is a side view partly in section illustrating my internal screen in combination with a pressure extruding type of screw feed for delivering sludge within an incinerator combustion chamber.

FIGURE 2 is a side elevation along the line 2—2 of FIG. 3 of a detail of the screen.

FIGURE 3 is a crosssection on the line 3—3 of FIG. 2 of the screen shown in FIG. 2.

The invention as illustrated in FIG. 1 is embodied in a screw feeder of the type shown and described in our patent application above referred to. This screw feeder includes a supply chute 11, an inner screw hopper 12 under the supply chute; a cylindrical screw casing 13 closed at one end by a partition 14 through which passes a hollow screw shaft 16 supported at one end by a bearing 17 and carrying a screw 18 which advances the moist fibrous dewatered sludge through a necked-down portion of the screw case portion 17, A reduced cylindrical portion of the screw 18 rotates within a reduced cylindrical section 19 of the screw casing forming a portion of maximum pressure.

Within the screw casing section 19 is located an internal cylindrical screen 21. As shown in FIGS. 2 and 3 this screen consists of a plurality of longitudinally extending wedge-shaped bars 20 with the narrow portion of the wedge extending radially inwardly, along which bars the sludge slides as it is fed through the section.

As shown in FIG. 2, this screen is provided with a bulbulous rounded cap 22 making it possible to thrust the screen into a mass of sludge without injury or clogging of the screen 22 shaft 16. At the base of the screen is a flange 23 secured to a stub tube 24 which protects the screen withdrawal. This stud tube is removably secured by wedge-shaped plugs or keys 26 to an elongated outer tube 29 which extends the full length of the screw shaft and beyond as shown in FIG. 1. A stop lug 30 limits forward movement of the screw. The external end of this tube is secured in a split clamp 31 permitting withdrawal of the tube and screen from within the hollow screw shaft. A flexible hose 2 carries away the liquid forced through the screen at the reduced portion 19 of the screw casing, through the tube 27 to the hose 32 and thence the liquid is discharged.

The entire screw and screw casing assembly is supported on a base 33 mounted in any suitable way such as shown in the above mentioned patent application for withdrawal from the refractory wall 34 of the combustion chamber to protect the assembly at the nozzle end from heat when feeding is stopped. To permit this without loss of pressure or leakage from within the combustion chamber a gasket casing 35 tightly fitted within a tube 36 within the refractory wall carries a gasket 36a.

In the operation of this dewatering device, the screw shaft 16 is rotated by any suitable drive means such as the pulley 39 to force the sludge material through the necked-down casing portion 17 and to extrude into the pressure section 19 thus forcing the liquids out of the sludge through the screen 21 over which the sludge is passing and thence out through the tube 29 and the hose 32.

The plug 40 of sludge material thus additionally dewatered is pushed out through the conduit or nozzle 19 into the fluidized bed 41 of incandescent inert material such as sand at a position substantially below the surface 42 in the lower half of the bed. Inwardly directed stationary knives 43 having inwardly inclined cutting edges and which are secured to the inner circumference of the conduit 19 slice the plug 40 longitudinally as it is pushed nto the fluidized bed. Because of the resistance of the knives to the plug, the pressure on the plug is increased tending to squeeze out more water. Thus the plug breaks into smaller solid pieces which burn evenly in the fluidized bed with a minimum of floating to the surface of the bed and thus burning at uncontrolled temperatures in the freeboard.

The wedge-shaped cross-section of the longitudinal bars 20 of the screen 21 permit maximum passage of liquid with minimum entrance of sludge material and likelihood of clogging. Also because they extend longitudinally in the direction of movement of the material, they tend to be self-cleaning. However, if the screen becomes clogged, it may be readily cleaned without stopping the feeding of the sludge material by loosening the clamp 31 and withdrawing the tube 27 with the screen assembly, through the hollow screw. Also because the tube 29 is readily adjustable longitudinally in the clamp 31, the screen 21 can be partially withdrawn into the screw so that part of the screen is shrouded by the screw thus controlling the effective area of the screen. This is of value because as the solid content of the plug 40 is increased the tendency to plug up the conduit 19 increases and hence with a high solids content sludge it may be necessary to cut down the dewatering effect of the screen 21.

In practice, it has been found that through the use of this internal screen the solids content of the plug 40 can be increased up to 50%, for example in one instance the solids content was increased from 30 to 48%, rendering combustion autogenous. In all instances when operating on centrifuged or filtered sewage sludge the invention will reduce or eliminate fuel costs or alternatively eliminate the need for expensive air preheating equipment.

Various changes may be made in the invention as disclosed without departing from the spirit and scope thereof and, therefore, the invention is not to be limited to that which is illustrated in the drawings and described in the specification, but only as indicated in the accompanying claims.

What we claim is:

1. A waste disposal system operating on organic sludge having a solids content of from 20 to 50% which system includes a combustion chamber containing a fluidized bed of incandescent inert material, comprising in combination a conduit communicating with said bed through a wall of said chamber below the upper surface of the bed, a sludge pump connected to said conduit for feeding sludge under pressure into said conduit to force a solid plug of said sludge into said bed, means for dewatering the sludge as it is fed by said pump to said bed including a hollow screen downstream of said pump and wholly within said conduit, for receiving liquid forced out of the sludge by said pump, and means for conducting liquid from the interior of said screen to the exterior of said conduit.

2. The invention according to claim 1, in which the sludge pump includes a cylindrical casing and a rotary impeller feeding longitudinally of said casing and in which the conduit has a reduced plug forming a portion of less diameter than the casing, said screen being located in said reduced plug forming portion.

3. The invention according to claim 1, in which said pump includes a rotary hollow feed worm having its axis extending in the direction of material feed and said conducting means comprises a tube extending through said worm.

4. The invention according to claim 3, in which said screen is secured to said tube and mechanism removeably securing said tube within said worm with the screen projecting beyond the downstream end of the worm by which the screen can be removed for cleaning without interfering with rotation of the worm.

5. The invention according to claim 1, in which fixed knives extend transversely of said conduit to divide the plug as it is forced into said bed.

6. The invention according to claim 3, in which mechanism is provided beyond the upstream end of said worm for supporting said tube for longitudinal adjustment by which the screen can be partially withdrawn into said hollow worm to thereby adjust the exposed area of the screen and thus the amount of liquid withdrawn.

7. A feeding and dewatering device for high liquid content compressible material comprising in combination a hollow cylindrical casing having a receiving and a delivery end, a rotary pump worm having a central bore in said casing coaxial with said casing for receiving said material and feeding it under pressure out of said delivery end, a hollow screen downstream of said rotor within the material being fed under pressure, characterized by means conducting liquid from the interior of said screen to the exterior of said casing comprising a tube extending through said bore and supporting said screen and means external to said worm for securing said tube against rotation.

8. The invention according to claim 7, in which said screen is of smaller diameter than said bore and in which said securing means is so constructed and arranged as to permit longitudinal adjustment of said screen to a position partially shrouded by said bore to vary the effective area of the screen and thus its dewatering effect.

9. The invention according to claim 7, in which said screen comprises a bar screen consisting of a series of spaced bars extending generally parallel the axis of said casing to provide slots extending in the direction of material feed.

10. The invention according to claim 7, in which said screen comprises a bar screen having a series of spaced bars of wedge-shaped cross-section with the narrow portion of the wedge directed inwardly, said bars having their lengths extending in the direction of material feed to provide longitudinal slots of inwardly increasing width.

11. An organic waste disposal system operating on moist organic sludge which system includes a combustion chamber for thermally oxidizing the sludge, comprising in combination a conduit having a restricted outlet communicating with the chamber through a wall portion thereof, a rotating worm sludge pump connected to said conduit having a worm feeding sludge under pressure through said conduit and out of said outlet, said worm having an axial bore, an internal dewatering screen extending beyond the end of said bore downstream thereof into the sludge in said conduit, a tube extending through said bore connected to said screen to support the same and withdraw liquid from the screen, said tube and worm being axially moveable with respect to each other.

12. The invention according to claim 11 wherein said screen has a diameter less than the diameter of the bore and releasable support means normally supporting the upstream end of said tube in stationary position but permitting axial withdrawal of said screen through the bore without interruption of the operation of said worm to permit cleaning of said screen.

No reference cited.

JAMES W. WESTHAVER, *Primary Examiner.*